United States Patent [19]

Sakakiyama

[11] Patent Number: 4,804,059
[45] Date of Patent: Feb. 14, 1989

[54] SYSTEM FOR CONTROLLING A TRANSFER CLUTCH OF A FOUR-WHEEL DRIVE VEHICLE

[75] Inventor: Ryuzo Sakakiyama, Tokyo, Japan
[73] Assignee: Fuji Jukogyo Kabushiki Kaisha, Tokyo, Japan
[21] Appl. No.: 101,057
[22] Filed: Sep. 25, 1987
[30] Foreign Application Priority Data Sep. 30, 1986 [JP] Japan ................................ 61-233485

[51] Int. Cl.⁴ ........................ B60K 23/08; B60K 31/00
[52] U.S. Cl. .................................... 180/197; 180/233; 180/247; 364/426.01
[58] Field of Search ........................ 180/247, 233, 197; 364/424, 426

[56] References Cited
U.S. PATENT DOCUMENTS

| | | | |
|---|---|---|---|
| 4,417,641 | 11/1983 | Kageyama | 180/247 |
| 4,511,014 | 4/1985 | Makita | 180/233 |
| 4,576,061 | 3/1986 | Yamakawa et al. | 74/665 T |
| 4,715,466 | 12/1987 | Ishii et al. | 180/233 |
| 4,723,624 | 2/1988 | Kawasaki et al. | 180/247 |

Primary Examiner—John A. Pekar
Attorney, Agent, or Firm—Martin A. Farber

[57] ABSTRACT

A four-wheel drive vehicle has a transmission, main drive wheels operatively connected to an output shaft of the transmission, auxiliary drive wheels, and a transfer clutch for transmitting output of the transmission to the auxiliary drive wheels. A control system is provided with a detector for detecting speed ratio of front-wheel speed and rear-wheel speed and for producing a speed ratio signal, which represents steering operation of the vehicle and for producing a steering angle signal. A control unit is responsive to the steering angle signal for controlling torque of the transfer clutch so as to cause the transfer clutch to slip in dependency on the steering angle signal.

8 Claims, 3 Drawing Sheets

SYSTEM FOR CONTROLLING A TRANSFER CLUTCH OF A FOUR-WHEEL DRIVE VEHICLE

BACKGROUND OF THE INVENTION

The present invention relates to a control system for four-wheel drive vehicles, and more particularly to a system for controlling the torque capacity of a transfer clutch for four-wheel drive vehicles.

A four-wheel drive vehicle of the type in which a transfer clutch is provided for transmitting the output torque of a transmission to auxiliary drive wheels is known. In such a vehicle, a power transmission system can be converted from a two-wheel drive system to a four-wheel drive system by engaging the transfer clutch. Meanwhile, when the vehicle negotiates corners, braking phenomenon called "tight corner braking" will occur at a sharp corner. This is caused by the front wheels running through an arc of greater radius than that of the rear wheels and therefore their tendency to rotate faster than the rear wheels, so that a large torsional torque occurs in the system. U.S. Pat. No. 4,576,061 discloses a system which is intended to eliminate the braking phenomenon. The system is provided with a steering angle sensor and a control system. The control system operates to convert a four-wheel drive power transmission operation to a two-wheel drive power transmission operation, when steering angle is larger than a set value at a sharp corner. However, although such a system prevents the tight corner braking at sharp corners by the two-wheel drive vehicle system, characteristics of the four-wheel drive vehicle such as driveability on slippery roads, uphill driving and other are not good. For example, when the vehicle negotiates a curve while the wheels of the vehicle slip on a snowy road, the transmission system is converted to a two-wheel drive in spite of slipping of wheels. As a result, the wheels slip more on the road. In addition, the steering angle sensor and the control system are complicated in construction.

SUMMARY OF THE INVENTION

Accordingly, the object of the prevent invention is to provide a system which detects steering angle without a steering angle sensor and controls a transfer clutch in accordance with the detected steering angle.

To this end, in the system of the invention, steering angle is detected by calculating the ratio of the front wheel speed and rear wheel speed.

The other objects and features of this invention will become understood from the following description with reference to the accompanying drawings.

DETAILED DESCRIPTION OF THE PREFERRED EMBODIMENT

Figure 1:
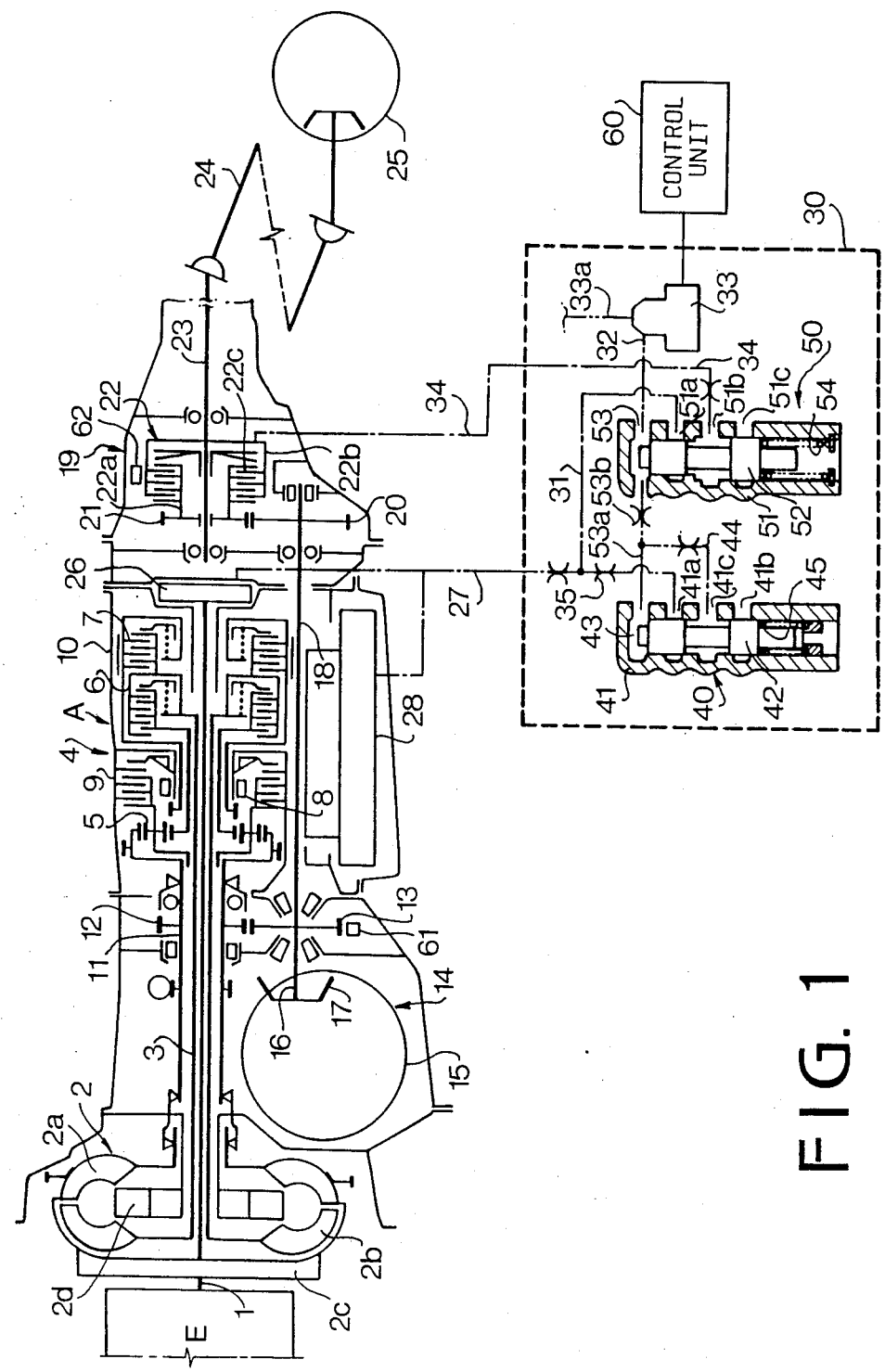
FIG. 1 is a schematic view showing a transmission system and a hydraulic control circuit thereof.

Referring to FIG. 1 an internal combustion engine E is mounted on a front portion of a vehicle. A crankshaft 1 of the engine is operatively connected with a torque converter 2 of an automatic transmission A.

The automatic transmission A comprises the torque converter 2, an automatic transmission device 4, and a final reduction device 14 for the front wheel drive.

The torque converter 2 comprises a pump impeller 2a, a turbine 2b and a stator 2d. The pump impeller 2a is in direct connection with the engine crankshaft 1 through a drive plate 2c. The turbine 2b has a turbine shaft 3 which extends from the turbine 2b to the automatic transmission device 4.

The automatic transmission device 4 comprises a planetary gear 5, clutches 6 and 7 for selectively transmitting the output of the turbine shaft 3 to the planetary gear 5, a one-way clutch 8, a brake 9 and brake band 10 for selectively locking elements of the planetary gear 5.

The output of the automatic transmission device 4 is transmitted to an output shaft 11 on which a drive gear 12 is securely mounted and which in turn engages with a driven gear 13. The driven gear 13 is secured on a shaft 16 which is integral with a drive pinion 17. The drive pinion 17 engages with a crown gear 15 of the final reduction device 14 for the front wheels. The shaft 16 is connected to a transfer drive shaft 18 which extends rearwardly and is connected to a first transfer gear 20 of a transfer device 19. The first transfer gear 20 is engaged with a second transfer gear 21, which is rotatably mounted on a rear drive shaft 23. A transfer clutch 22 in the form of a fluid operated multiple-disk friction clutch is mounted on the rear drive shaft 23 for engaging the gear 21 with the shaft 23. The rear drive shaft 23 is further operatively connected to a final reduction device 25 for rear wheels of the vehicle through a propeller shaft 24. The transfer clutch 22 comprises a hub 22a secured to the second transfer gear 21, a drum 22b secured to the shaft 23, a plurality of disks 22c splined on the hub 22a and a plurality of disks 22d splined on the drum 22b, alternately arranged. The transfer clutch 22 operates to connect the gear 21 with the shaft 23, when the disks 22c are engaged by applying oil pressure to the clutch 22. Thus, the rotation of the gear 21 is transferred to the rear drive wheels.

An oil pump 26 is provided in the automatic transmission A behind the automatic transmission device 4 and a transmission control device 28 communicated with the pump 26 is disposed under the shaft 18.

A hydraulic control circuit 30 for the transfer clutch 22 is explained hereinafter. The hydraulic circuit 30 comprises a pressure regulator valve 40, a transfer control valve 50, a solenoid operated valve 33, and a control unit 60. The pressure regulator valve 40 comprises a valve body 41, spool 42, end chamber 43, spring 45 for urging the spool 42 in a direction toward the end chamber 43. A port 41a is communicated with the pump 26 through a passage 27 having an orifice 35. The spool 42 is shifted by the difference between forces exerted on both ends thereof, one of which is the pressure of oil in the chamber 43 and the other is force exerted by the spring 45. When the spool 42 is downwardly shifted, a drain port 41b opens, thereby draining the oil in the chamber 43 through a passage 44 and ports 41c and 41b. When the spool 42 is upwardly shifted, the port 41a opens, so that oil is supplied to the chamber 43 through passage 27, ports 41a and 41c, and passage 44. Thus, the pressure of oil in the chamber 43 is kept constant.

Designating the pressure receiving area of the spool 42 in the chamber 43 by S, regulator pressure of oil in the chamber 43 by Pr and the force exerted by the spring 45 by F, $$Pr \cdot S = F$$

$$Pr = F/S$$

Accordingly, the pressure Pr can be kept constant.

The transfer control valve 50 comprises a valve body 51, spool 52 having two lands which are different in diameter, end chamber 53 communicated with the chamber 43 through a passage 53a having an orifice 53b, spring 54, port 51a communicated with the passage 27 through a passage 31, port 51b communicated with the transfer clutch 22 through passage 34, and drain port 51c. The chamber 53 is communicated with the solenoid operated valve 33 through a passage 32 so as to provide control pressure $P_C$ in chamber 53. The control pressure $P_C$ and clutch pressure $P_T$ of oil in the transfer clutch urge the spool 52 downwardly against the spring 54. When the spool moves downwardly, port 51a is closed and drain port 51c is opened, so that the clutch pressure $P_T$ decreases. To the contrary, when the spool 52 is upwardly shifted, port 51a opens to increase the clutch pressure $P_T$.

Thus equation for the control pressure $P_C$, clutch pressure $P_T$, the force F exerted by the spring 54, the area S1 of a large diameter piston and the area S2 of a small diameter piston, is $$P_C \cdot S2 + P_T(S1 - S2) = F$$

Therefore $$P_T = (F - P_C \cdot S2)/(S1 - S2).$$

Since S1, S2 and F are constant, the clutch pressure $P_T$ is inversely related to the control pressure $P_C$. The solenoid operated valve 33 is operated by a pulse train applied from the control unit 60. The control pressure $P_C$ is controlled by changing the duty ratio of pulse in the pulses train.

Figure 2:
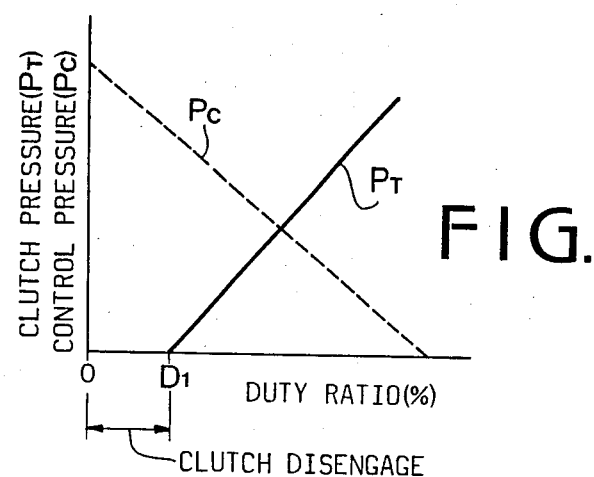
FIG. 2 is a graph showing relationships between clutch pressure, control pressure and duty ratio.

FIG. 2 shows the relationship between the clutch pressure $P_T$, control pressure $P_C$ and duty ratio. When the duty ratio is at 0%, the solenoid operated valve 33 does not drain the oil in the end chamber through a drain passage 33a. Accordingly, the control pressure is at the highest value which is equal to the regulator pressure Pr. As the duty ratio increases, the control pressure $P_C$ reduces as shown by a broken line. On the other hand, the clutch pressure $P_T$ is zero in a range smaller than a small duty ratio D1 and increases with increase of the duty ratio from the duty ratio D1.

Figure 3:
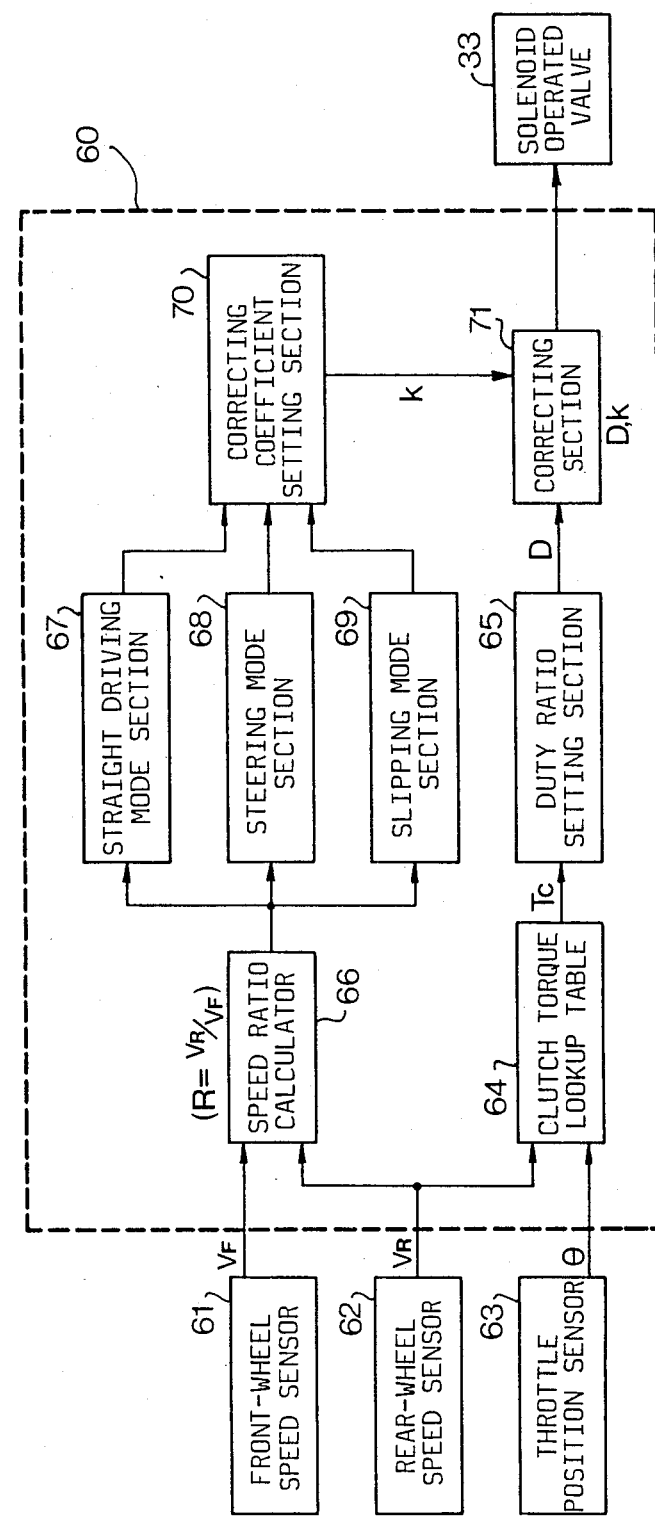
FIG. 3 is a block diagram of a control unit of the present invention.

Referring to FIG. 3 showing a block diagram of a system according to the present invention, the system has a front-wheel speed sensor 61, rear-wheel speed sensor 62 and throttle position sensor 63. As shown in FIG. 1, the front-wheel speed sensor 61 is provided adjacent the gear 13 and the rear-wheel speed sensor 62 is provided adjacent teeth (not shown) formed on the periphery of the drum 22b of the clutch 22. Output signals $V_R$ and $\theta$ of the rear-wheel speed sensor 62 and the throttle position sensor 63 are fed to a transfer clutch torque lookup table 64 where a clutch torque capacity $T_C$ is derived dependent on the signals. It will be understood that the output signal $V_R$ also represents the speed of the vehicle. Since the vehicle in the present embodiment is always driven by the front wheels, and hence the front wheels may slip, the rear-wheel speed $V_R$ is adopted as accurately representing actual vehicle speed. The clutch torque $T_C$ is set at a large value in a heavy load range such as when the vehicle is at a start of climbing uphill. The value becomes small in a light load range at normal driving conditions. A duty ratio setting section 65 produces a duty ratio signal D dependent on the clutch torque $T_C$. In accordance with the characteristic of FIG. 2, the duty ratio D is an increasing function of the clutch torque $T_C$.

It will be understood that the steering angle can be represented by the ratio of the front-wheel speed and rear-wheel speed. Accordingly, in the system, an output signal $V_F$ of the front-wheel speed sensor 61 and the output signal $V_R$ of the rear-wheel sensor 62 are fed to a speed ratio calculator 66 where the speed ratio R of the front wheel speed and the rear wheel speed is calculated from an equation $R = V_R/V_F$. The speed ratio R at a maximum steering angle is determined in accordance with the characteristics of the vehicle. For example, the speed ratio at the maximum steering angle is 0.8. The speed ratio is 1 when the vehicle is driven straight.

The control unit 60 is provided with a straight driving mode section 67, a steering mode section 68 and a slipping mode section 69. The section 67 produces an output signal when R=1, and the steering mode section 68 produces an output signal when $1.0 > R \geq 0.8$. When the ratio R is smaller than 0.8 (R<0.8), which means slipping of the front wheels, the slipping mode section 69 produces an output signal.

Figure 4:
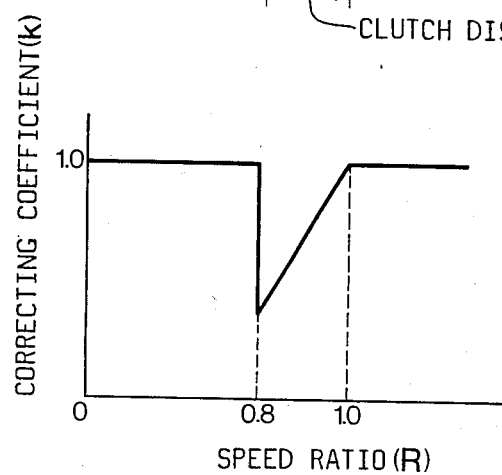
FIG. 4 is a graph showing a relationship between speed ratio of the front and rear wheels and transfer clutch torque.

The output signal of each section is applied to a correcting coefficient setting section 70 where a correcting coefficient K is set in accordance with a graph shown in FIG. 4. The correcting coefficient K is 1 upon occurrence of the output signals of the sections 67 and 69. In response to the output signal of the steering mode section 68, the rate K is determined as a function of the speed ratio R ($K=f(R)$). The coefficient K is fed to a correcting section 71 where the duty ratio signal D is corrected. The corrected duty ratio is obtained by multiplying the duty ratio by the coefficient K. The corrected duty ratio signal is then applied to the solenoid operated valve 33.

The operation of the control system is hereinafter described.

The power of the engine E is transmitted to the automatic transmission device 4 through the torque converter 2 and turbine shaft 3, and further to the shaft 16 through the gears 12 and 13. The torque is transmitted to the front wheels through the drive pinion 17 and crown gear 15. The torque is also transmitted to the rear wheels through the shaft 18, gears 20 and 21, transfer clutch 22, rear drive shaft 23, propeller shaft 24 and final reduction device 25. Accordingly, full time four-wheel driving is established.

In the control unit 60, an appropriate clutch torque $T_C$ depending on the rear-wheel speed $V_R$ and throttle opening degree $\theta$ is derived from the lookup table 64. In a light load range, clutch torque $T_C$ is set at a small value. Accordingly, the duty ratio setting section 65 produces a signal D representing a small duty ratio. Therefore, the solenoid operated valve 33 operates to apply a large control pressure $P_C$ in the end chamber 53 of the transfer control valve 50. As a result, the spool 52 is downwardly shifted to close the port 51a so as to decrease the clutch pressure $P_T$. Thus, the disks 22c in the transfer clutch 22 are partially engaged so that a small torque is transmitted to the rear wheels.

As the engine load increases, a larger clutch torque $T_C$ is set so that the duty ratio setting section 65 produces a signal representing a large duty ratio. Therefore, the solenoid operated valve 33 is opened to drain the oil from the port 33a. Accordingly, the spool 52 is upwardly shifted so as to communicate the port 51a with the port 51b. Thus, the oil is applied to the transfer clutch 22 through the passage 34, thereby increasing the clutch pressure $P_T$. Consequently, the larger torque is transmitted to the rear wheels, thus improving the characteristics of the four-wheel driving.

Figure 5:
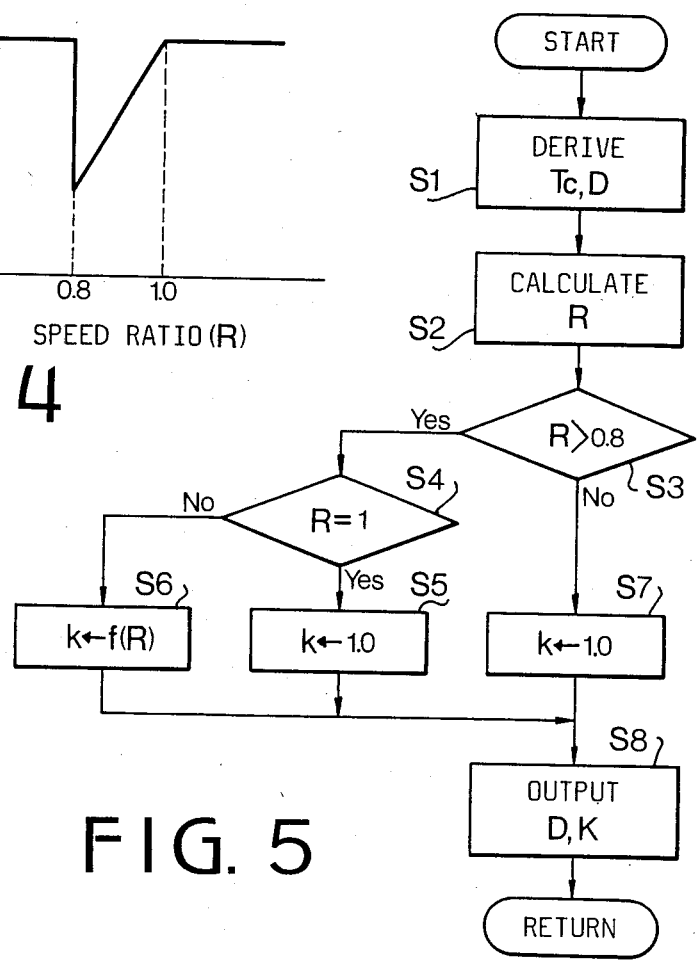
FIG. 5 is a flowchart showing operation of the system.

The duty ratio correcting operation for preventing the tight corner braking phenomenon and slipping of wheels will now be described with reference to FIG. 5. The clutch torque $T_C$, and hence the duty ratio, are obtained in accordance with the rear-wheel speed $V_R$ and the throttle opening degree $\theta$ at step S1. Then the speed ratio R of the front-wheel speed $V_F$ and rear-wheel speed $V_R$ is calculated at step S2. At steps S3 and S4 when the ratio R is 1, the correcting coefficient K is set to 1 (step S5). Thus, clutch torque $T_C$ is controlled in the above described manner.

When the ratio R is larger than 0.8, but not 1 ($1.0 > R \geq 0.8$), the steering mode section 68 is selected. The correcting coefficient K which is smaller than 1 is calculated in accordance with $K = f(R)$ (step S6). That is, as the steering angle becomes large, the correcting coefficient K reduces, thereby decreasing the duty ratio. Thus, clutch torque $T_C$ of the transfer clutch 22 decreases. Accordingly, the tight corner braking is prevented by slipping of the clutch.

When the ratio R is smaller than 0.8, the slipping mode is selected and the coefficient K is set to 1 (step S7). Accordingly, the operation is the same as the straight driving mode. The correcting coefficient K in the slipping mode may be set at a value larger than 1 so as to provide a larger torque to the rear wheels, thereby preventing the slipping of wheels.

From the foregoing, it will be understood that the present invention provides a system for controlling a transfer clutch where tight corner braking is prevented without employing a steering angle sensor. In other words, since the front-wheel speed sensor and rear-wheel speed sensor are used for detecting the steering angle and slipping of wheels, the system may be simplified in construction.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. In a control system for a four-wheel drive vehicle having an engine having a throttle valve operatively connected with an accelerator pedal, a transmission operatively connected to the engine, main drive wheels operatively connected to an output shaft of the transmission, auxiliary drive wheels, a transfer clutch actuated by pressurized oil for continuously transmitting the output of the transmission to the auxiliary drive wheels, first speed sensing means for operatively detecting an output of the transmission for sensing speed of the main drive wheels for producing a first speed signal dependent on said speed, second speed sensing means operatively detecting an output of the transfer clutch for sensing speed of the auxiliary drive wheels for producing a second speed signal dependent thereon, and means for controlling torque of the transfer clutch in accordance with driving condition of the vehicle, the improvement in the system which comprises throttle position sensing means for detecting an opening degree of the throttle valve, speed ratio calculating means responsive to the output signals of the first and second sensing means for calculating a speed ratio of the first and second speed signals for producing a speed ratio signal depending on the driving condition of the vehicle, mode detecting means for deciding a straight driving mode, and a steering mode and a slipping mode by comparing said speed ratio signal with a maximum steering angle value predetermined by a characteristic of the vehicle for producing a straight driving mode signal, a steering mode signal and a slipping mode signal, respectively, clutch torque decision means responsive to said second speed signal and an output signal of the throttle position sensing means for deciding a clutch torque dependent on load ranges of the vehicle for producing a clutch torque signal, and correcting means responsive to the mode signal of the mode detecting means for correcting said clutch torque signal dependent on each respective mode, so as to continuously control the pressurized oil supplied to said transfer clutch depending on the driving condition of the vehicle of straight driving, cornering driving by steering, and slipping of the wheels.

2. The system according to claim 1, wherein said correcting means comprises a correcting coefficient setting section which sets a coefficient varying as a function of the speed ratio for values of the speed ratio between 1 and said maximum steering angle value in said steering mode, and a correcting section which multiplies said coefficient and said clutch torque signal so as to provide a signal for the control of said pressurized oil supplied to said transfer clutch.

3. The system according to claim 2, wherein said coefficient is less than 1 in said steering mode, and wherein said correcting coefficient setting section sets the coefficient to 1 in speed ratios in the straight driving mode and the slipping mode.

4. The system according to claim 2, wherein said coefficient is less than 1 in said steering mode, and wherein said correcting coefficient setting section sets the coefficient to 1 in speed ratios in the straight driving mode and to greater than 1 in the slipping mode.

5. The system according to claim 2, wherein said function is a linear function.

6. The system according to claim 1, wherein said correcting means is for increasing the clutch torque of the transfer clutch in the steering mode as the speed ratio increases and for increasing the clutch torque of the transfer clutch in the slipping mode.

7. The system according to claim 1, wherein said correcting means is for decreasing the clutch torque of the transfer clutch as the speed ratio increases from the slipping mode to the maximum steering angle value in the steering mode.

8. The system according to claim 7, wherein said decreasing of the clutch torque is a discontinuous decrease at the speed ratio corresponding to the maximum steering angle value in a disengagement direction of the transfer clutch.

* * * * *